April 16, 1940.   A. F. BURKARDT   2,197,683
DECORTICATING MACHINE
Original Filed Nov. 19, 1937   5 Sheets-Sheet 1

INVENTOR
Anton F. Burkardt
BY
HIS ATTORNEY

INVENTOR
Anton F. Burkardt
BY
HIS ATTORNEY

April 16, 1940.  A. F. BURKARDT  2,197,683
DECORTICATING MACHINE
Original Filed Nov. 19, 1937   5 Sheets-Sheet 3

INVENTOR
Anton F. Burkardt
BY
HIS ATTORNEY

April 16, 1940.  A. F. BURKARDT  2,197,683.
DECORTICATING MACHINE
Original Filed Nov. 19, 1937  5 Sheets-Sheet 4

INVENTOR
Anton F. Burkardt
BY
Henry J. Lucke
HIS ATTORNEY

April 16, 1940. A. F. BURKARDT 2,197,683
DECORTICATING MACHINE
Original Filed Nov. 19, 1937 5 Sheets-Sheet 5

Patented Apr. 16, 1940

2,197,683

UNITED STATES PATENT OFFICE 2,197,683

DECORTICATING MACHINE

Anton F. Burkardt, New York, N. Y.

Application November 19, 1937, Serial No. 175,496
Renewed September 28, 1939

16 Claims. (Cl. 19—24)

My present invention relates to machines for treating vegetable stalks containing fiber, and more particularly of an improved machine for decorticating vegetable stalks such as hemp, flax, ramie and the like.

My present invention is designed to decorticate vegetable stalks in the dry or semi-dry state as distinguished from the wet or wetting process and removes the shives from the stalk by a mechanical process, such process being carried out by mechanical means.

An important feature of my invention is an improved device for automatically feeding the stalks to the decorticating mechanism. This feature of my invention permits the stalks to be placed in the machine and my improved device feeds the same out gradually in any desired amount which, however, is substantially equal to the capacity of the decorticating mechanism to operate on the stalks. A particular feature of the invention is the means for adjusting the width of the feed blades to control thereby the width of the flowing stream of fibrous material in its passage through the machine. There is thus a controlled even supply to form an even stream or sliver of fiber.

Another feature of my invention is an improved feeding mechanism for positively feeding the stalks longitudinally to a decorticating mechanism and simultaneously with the feeding to prepare the same for decortication by primarily breaking or cracking the shive constituents of the stalks.

A further feature of my invention is an improved device for mechanically removing the shives from the stalks and which device produces in conjunction with an adjustable cutting edge on an adjustable end or table associated with the feeding rollers and a device for maintaining the stalks in the advantageous position for the decorticating mechanism to operate thereon.

A still further feature of my invention is an improved mechanism for receiving the decorticated fiber, or stalks from the decorticating mechanism by a scutching mechanism while the fiber is held in suspension between the decorticated part of the stalks and the scutch bars, and gripping such fibers and feeding the same from the decorticating mechanism onto a combined combing and feeding or conveying apparatus.

A further feature of my invention is an improved decorticating mechanism operating in conjunction with the first decorticating mechanism and with the latter having feeding rolls for additional operation on certain of the fibers passing through the machine to completely decorticate the fibers prior to their being fed to the decorticating mechanism and thence onto the combing conveyors.

A further feature of my invention is an improved device for maintaining substantially a sub-atmospheric pressure at the lower end of the complete device and whereby shives, which have been separated from the vegetable stalks are caused to fall faster than is otherwise possible to maintain the mechanism free of shives and to allow a faster speed of the machine.

A further feature of the invention is a machine for making a direct sliver of fibrous material from the stalk and forcing the same in condition to be used as means for directly making cordage.

A further feature of my invention is an improved means for picking up and parallelly arranging the fibers of the material and maintaining them parallel to thus prevent tangling thereof, and to deliver the fibers in the form of a so-called long line fiber or sliver.

Another feature of my invention is an improved means in association with a decorticating machine for arranging the decorticated fibers in parallel relation with respect to each other and cutting such parallelly arranged fibers into desired lengths suitable for textile and other purposes.

In the accompanying drawings.

Referring to the drawings, 10 designates generally a framework in which the operating elements of my improved device are mounted and which framework is enclosed in a sheet metal or other suitable casing 11 so as to have the same practically air-tight. A slidable cover 12 or a manhole is provided in the casing 11 and through which access is obtained to various parts of the mechanism contained therein. Also, various entrances, such as an entrance through feed rolls 13 and feed rolls 14 are provided, and means such as the flaps 15 associated with the feed rolls 13 and flaps 16 associated with the feed rolls 14 help to maintain the air-tight condition of the casing 11.

At the lowermost end of the casing 11 is arranged an exit pipe 17 to which is connected an exhaust blower 18 connected to a source of power (not shown) and by means of which air as well as the accumulated shives may be withdrawn from the interior of the casing 11. For the purpose of creating a flow of air in predetermined direction and at various desired points throughout the casing 11 I provide entrance pipes 19 provided with control means, and the location of which and the function of which will be hereinafter described.

The casing 11, as stated above, contains the actual decorticating mechanism. Associated therewith and located on the exterior of the casing 11 and attached to the framework 10 is a feeding device mounted on a table or platform 20 and supported on the framework 10 by the bracket 21. On either side of the platform or table 20 are side walls 22. The central portion of the platform or table 20, is cut away as indicated by the reference numeral 23, and such space is filled with the upper operative reach of an endless conveyor belt 24 mounted on rollers 25 at each end of the cutaway portion 23.

The rollers 25 are rotatably mounted in bearings 26 secured to the under face of the platform or table 20 and such rollers are rotated in any suitable manner and in such a way to have the upper reach thereof moved toward the mechanism mounted on the framework 10 within the casing 11.

On the under face of the platform or table 20 and arranged parallel to the rollers 25 are additional rollers 27 which support the upper operative reach of the endless conveyor 24 at various points. One of such points is shown in detail in Fig. 4 and referring to such Fig. 4, it will be noted that to the side walls 22 and to the upper surface of the platform 20 are secured brackets 28. In these brackets on opposite sides of the conveyor 24 are aligned bearings 29, and in which aligned bearings is rotatably mounted a shaft 30. On such shaft between the side walls 22 is secured a roller 31 having formed therein a plurality of spaced circumferential grooves 32. The shaft 30 has secured on one end a sprocket wheel 33 and over which a driving mechanism passes to impart rotation to the shaft 30 and therefore to the roll 31. At the end of the shaft 30, remote from the sprocket wheel 33, is secured a cam 34, the race of which is engaged by a stationary pin 35 secured to one of the brackets 28. From the above it is evident that rotary movement of the shaft 30 will cause a rotary movement of the roller 31, and because of the cam 34 and pin 35, there will be imparted to the roller 31 a reciprocating motion transversely of the conveyor 24.

Figure 4:
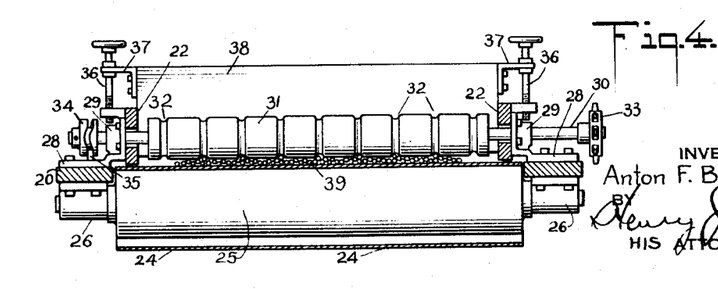
Fig. 4 is a section taken on the line 4—4 of Fig. 1.

The upper part of the brackets 28 have screw threaded therein the hand adjusting screws 36. Such screws are rotatably mounted in brackets 37 secured to the ends of a gate or dam 38, and which dam determines the amount of stalks which can be fed by the conveyor 24 under the roller 31.

Figures 1, 5:
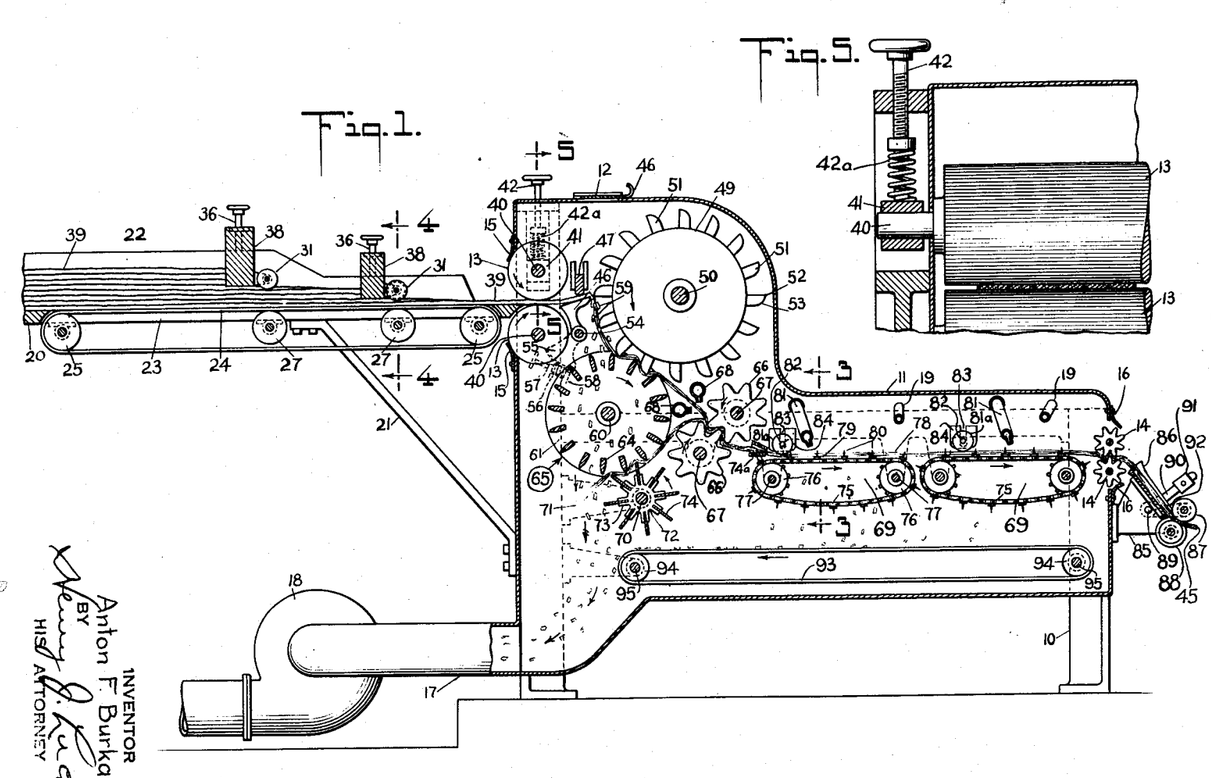
Fig. 1 represents in sectional side elevation a decorticating machine embodying my present invention.
Fig. 5 is a section taken on the line 5—5 of Fig. 1.

There are two of the stations illustrated in Fig. 4 employed in the structure shown in Fig. 1 for adjusting the volume of feed to regulate size of sliver. The other structure to the left of the section line 4—4 of Fig. 1 is identical with that shown in Fig. 4 and above described.

The stalks designated by the reference numeral 39 in Fig. 1 are placed or fed onto the platform or table 20 and are moved to the right, as shown in such Fig. 1, by the endless conveyor belt 24. The stalks 39 are fed onward by the conveyor 24 end-to-end or in substantially parallel relation to each other in an end-to-end or longitudinal direction, and in so doing that portion of the stalks which engage with the dam 38, will be precluded from passing onward into engagement with the roller 31, until such time as the endless conveyor belt 24 has moved some of the lowermost stalks 39 to a point beyond the dam 38. The distance of the dam 38 of the device illustrated in Fig. 4, and as shown in Fig. 1, above the conveyor belt 24 determines the amount of stalks 39 being continually fed to the feeding and decorticating devices to be hereinafter described.

The stalks are fed to the decorticating devices in practically an even layer with the stalks arranged parallel to each other, and with the stalks being fed to the decorticating devices longitudinally as distinguished from a lateral direction. In order to even out the layer of stalks 39, the roller 31 has imparted thereto a reciprocatory motion as well as a rotary motion and the grooves 32 therein, as illustrated in Fig. 4, smooth out or iron out the upper over-lapping stalks in the layer of stalks 39 prior to the entrance of said stalks into engagement with the decorticating devices.

In order to obtain optimum results in mechanical decorticating of vegetable stalks it is desirable to preliminarily operate upon the shive portion, to place such shive portion in the best condition to be operated upon by the actual shive removing means. In my present invention this is accomplished by a pair of feed and preparing rolls 13 arranged parallel to each other and mounted on shafts 40, such shafts being rotatably mounted in suitable bearings in the side members of the framework 10. The uppermost shaft 40 is preferably mounted in a slidable and yieldable mounted set of bearings 41 having associated therewith means 42 for raising or lowering the same with respect to the lowermost shaft 40. A spring 42a interposed between the means 42 and the bearing 41 serves to yieldably force the upper feed roll 13 toward the lower feed roll. By these means, the distance between the opposing faces of the rolls 13 may be adjusted. The surface of the rolls 13 are provided with longitudinal grooves 43 (see Fig. 2) which as the stalks 39 pass between them, form a plurality of grooves or cuts 44 which extend partially or totally, as the case may be, through the shive portion only of the stalks 39, and thus place the shive portion in the best condition to be mechanically broken and partially removed from the fibrous portion 45 of the stalks 39.

The transverse grooves or cuts 44 in the shive portion of the stalks 39 of fiber make such portion easy to break into a plurality of portions and place such portions in condition to be easily and readily removed from the fibrous portion 45 during the actual decorticating operation.

At the exit end of the throat formed by the feed rolls 13 is positioned an adjustable platform or anvil 46, and over which the stalks 39 are fed. The anvil 46 is adjustable in order to permit the stalks 39 to be fed in the most advantageous position to the decorticating rolls to be hereinafter described. It has been found that the best results are attained if the upper surface of the anvil 46 extends at an angle so that the stalks 39 are fed in a slightly upward direction prior to the engagement thereof with the decorticating device.

Figure 2:
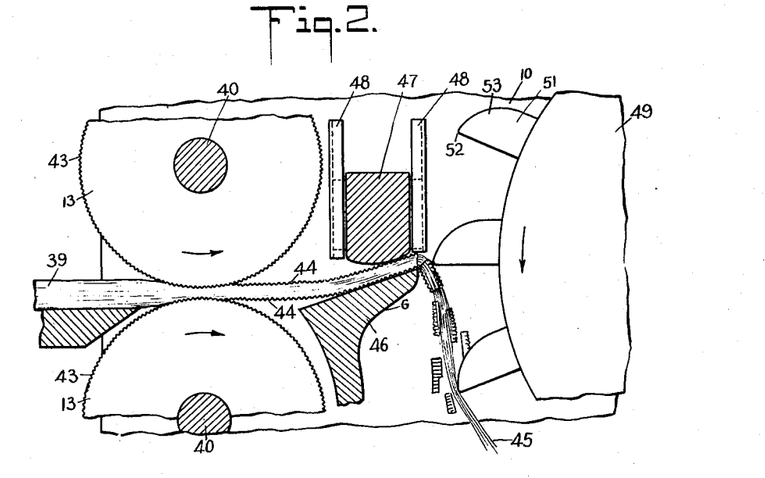
Fig. 2 is an enlarged fragmentary view in sectional elevation of the feeding rolls, adjustable table, and decorticating element illustrated in Fig. 1.
Figure 3:
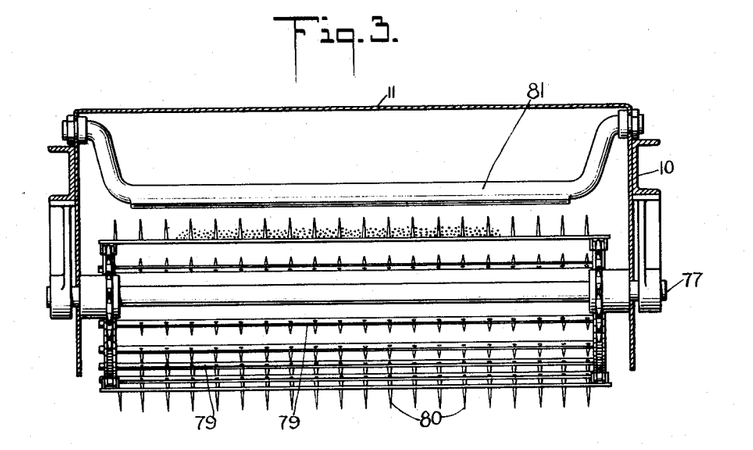
Fig. 3 is a section taken on the line 3—3 of Fig. 1.

Also associated with the anvil 46 and acting to hold the stalks 39 in the most advantageous position with respect to the decorticating device, is a weight-bar 47 and which weight-bar is freely slidable in a vertical direction in guides 48 secured to the walls of the framework 10, (see Fig. 2).

As the stalks pass over the anvil 46, and between such anvil and the weight-bar 47 they are in position and condition to be most advantageously acted upon by the decorticating devices. The primary decorticating device in my present disclosure is shown in considerable detail, but such showing is for convenience only and it is within the scope of my invention to employ any suitable primary decorticating device. The decorticating device shown comprises essentially a roller 49 secured to a shaft 50, and which shaft is rotatably mounted in suitable bearings in the side members of the framework 10. Also, the shaft 50 is connected to a suitable driving means for rotating the same in the direction of the arrow shown in Fig. 1.

Mounted on the roller 49 and spaced around the periphery thereof and extending radially outwardly from the shaft 50 are members or blades 51 which may be of any desired shape but preferably of the shape shown in Fig. 1, that is with the leading edge 52 thereof relatively sharp and the body of the teeth rounded as indicated by the reference numeral 53. The anvil 46 is adjustable and preferably to obtain the maximum results therefrom, the upper surface is curved upwardly from the back end thereof so that the stalks 39 as they pass through the rollers 13 are moved in an upward direction, as clearly shown in Fig. 1.

The relative position of the anvil 46 with respect to the corrugated feed rolls 13 and the teeth 51 carried by the cylinder 49 may be varied to obtain the best position by having the anvil mounted as follows. In the side members of the framework 10 are bearings in which is rotatably mounted a shaft 54, and to such shaft is secured the anvil 46. At one end of the shaft 54 is secured a quadrant 55 of a worm wheel with which meshes a worm 56 secured to a shaft 57 that is rotatably mounted in suitable bearings 58 on the side frame members. If desired the shaft 50 may also be adjustable in order to provide for lateral movement of the roller 49 toward and from the anvil 46. The effect in either event is to obtain the best position between the leading edge of the anvil 46 and the leading edge 52 of the radially extending members 51 on the roller 49.

As the stalks 39 pass over the anvil 46 they are held in position by means of the weight-bar 47. The roller 49 rotates in the direction of the arrow shown in Fig. 1, and as the stalks 39 are fed through the corrugated rollers 13 and over the anvil 46 the stalks are gradually and progressively exposed to a beating action by the teeth 51, with the result that the shives which have been cut or scored transversely, as indicated by the numeral 44 in Fig. 2, by the corrugations 43 on the corrugated rollers 13 are removed from the stalks. Such shives for convenience and for clarity of illustration are designated by the reference numeral 59 in Fig. 1. Such shives fall downwardly by gravity, following generally the path indicated in Fig. 1, and their passage downward and out from the casing 11 may be accelerated by exhausting air from the casing 11 through the pipe 17 by means of the fan blower 18.

Figures 9, 10, 11:
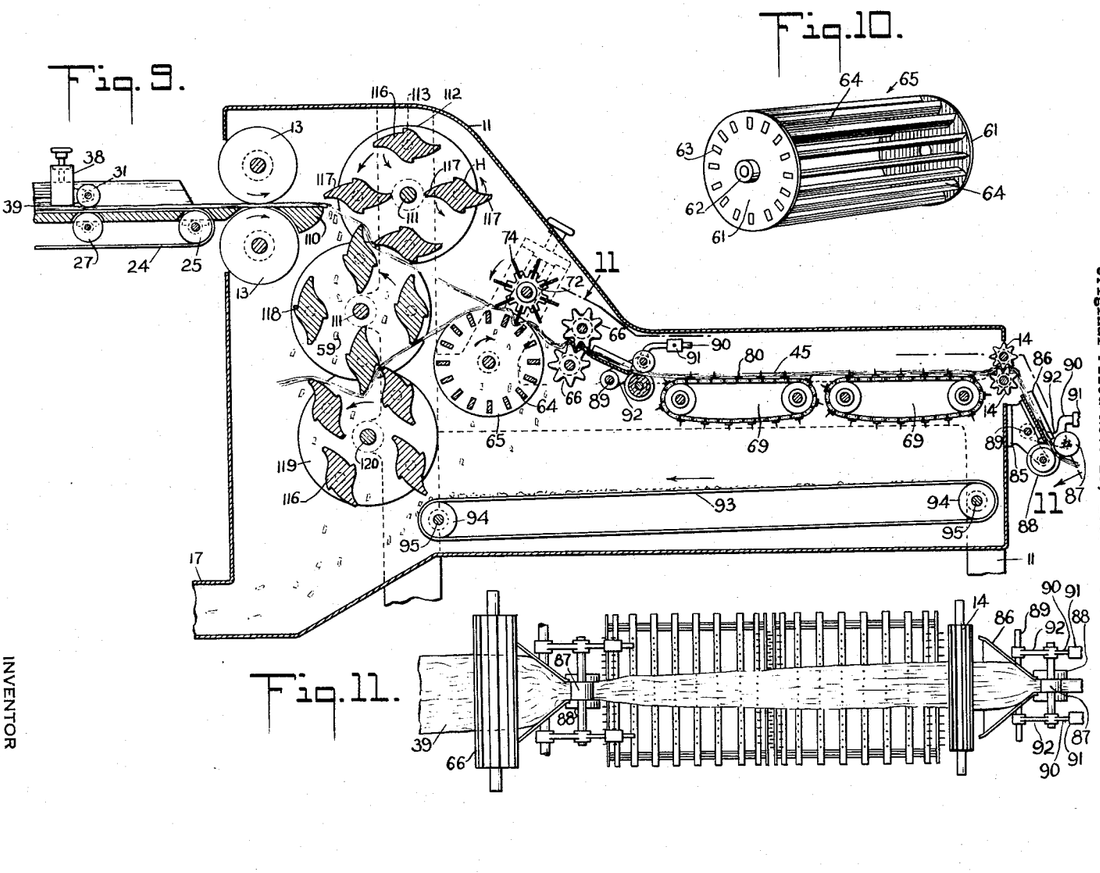
Fig. 9 is a view of a modified form of my improved decorticating machine illustrating different type and arrangement of decorticating elements from that shown in Fig. 1.
Fig. 10 is a perspective view of a beater roll for cooperating with a decorticating mechanism.
Fig. 11 is a plan view of the fiber conveying and combining mechanism, taken on the line 11—11 of Fig. 9.

Arranged parallel to the shaft 50 is a shaft 60 on which is mounted a cylinder having as essential elements thereof radially disposed spaced bars which cooperate with the teeth 51 on the roller 49. One of such cylinders is shown in Fig. 10 and comprises essentially circular end plates 61 having centrally arranged bearings 62 thereon for engagement with the shaft 60 above referred to, and each end plate 61 is provided with a plurality of circumferentially arranged perforations 63 through which extend the reduced ends of bars 64. The bars 64 are substantially rectangular in cross section and are radially arranged about the axis of the end members 61. Also, the bars 64 are of suitable width or depth and thus there is provided a cylindrical member, such as shown in Fig. 10, having practically spaced teeth which cooperate with the teeth 51 on the roller 49. The outer peripheral edge of the bars 64 are V-shaped or square, as shown and the edges may be relatively sharp to assist in removing the shives from the stalks 39. For convenience, the structure illustrated in Fig. 10 is designated by the reference numeral 65.

Figures 12, 13, 14, 15, 16:
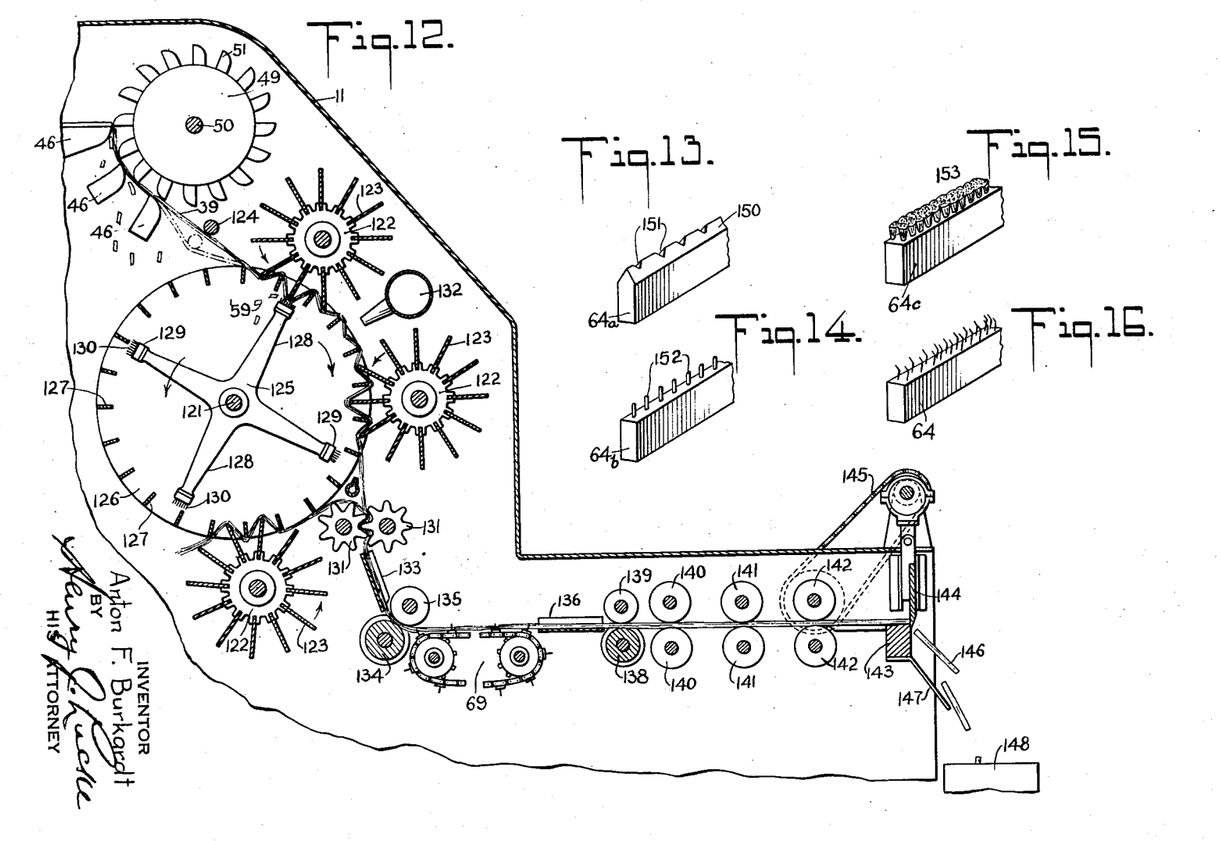
Fig. 12 is a sectional side elevation of a still further modified form of my invention.
Figs. 13, 14, 15 and 16 are perspective views of modified forms of the bars or blades employed in the beater rolls illustrated in Fig. 10.

The bars 64 may be V-shaped or square as stated above, or such edges may be plain as shown in Fig. 10, or if the edge is V-shaped, be serrated, or provided with notches throughout the length thereof. The various forms referred to are shown in Figs. 13, 14, 15 and 16 and wherein in Fig. 13 a modified form of bar 64a is shown as having its working edge V-shaped as indicated by the reference numeral 150 and such V-shaped edge is provided with a plurality of serrations 151. In Fig. 14, the bar 64b is shown rectangular and its working edge has projecting therefrom a plurality of parallelly arranged spaced pins 152. In Fig. 15, there is employed the rectangular bar 64c which has on its working edge a brush 153, which extends throughout the length of the bar. In Fig. 16, the bar 64d which is rectangular has on its working edge, a plurality of outstanding "card" teeth 154.

Further, if the edges are square as stated above, such edges may be plain or the edge surface may be provided with a plurality of radially extending pins or bristles or similar elements, and which elements will exert a combing as well as a decorticating action on the fibers 39. Depending on the character of the bars 64, one may get a number of different scutching effects on the fibers 45, and further, it may be advisable in some circumstances to provide the scutching wheel 65, shown in Fig. 10, with scutching bars of various characteristics such as has been just described, so that the different scutching effects produced by the different types of bars 64, 64a, 64b, 64c, 64d may be attained in a single decorticating or scutching wheel 65.

The roller illustrated in perspective in Fig. 10, and which for convenience is designated in its entirety by the reference numeral 65, has the bars 64 thereof cooperating with the teeth 51 of the roller 49, so as to form between associated elements a sinusoidal path into which is fed the stalks 39. It will be obvious from an inspection of Fig. 1, that the sinusoidal path referred to causes a flexing of the fibers 39, while in such sinusoidal path the stalks are being continually worked upon so as to facilitate and accelerate the removal of the shives therefrom.

The path of movement of the fibers 39 after passing through the space between the teeth 51 and bars 64 is clearly shown in Fig. 1, and ultimately such fibers come into engagement with corrugated rollers 66. These rollers are arranged or parallelly arranged shafts 67, which shafts are rotatably mounted in the side members of the frame 10 and are geared together in any suitable manner so as to rotate at the same speed and in the direction of the arrow shown in Fig. 1. The rollers 66 are corrugated and for the diameter of the rollers the size of the corrugations is relatively large. Preferably, also, the surface of the corrugations is covered with a resilient, non-corrosive material and preferably with rubber or similar material.

In the space between the rollers 49 and 65 and the corrugated rollers 66, and on each side of the fibers 39, are arranged pipes 68, there being one of such pipes above, and one of such pipes below, the fibers 45. Such pipes extend across the width of the framework 10 and may be provided either with a plurality of closely arranged orifices along their length or may be provided with a continuous slot extending throughout the length of the pipe and through which orifices or slot air under pressure, if pressure is to be applied to the interior of the case 11, or with air at atmospheric pressure if an exhaust system of removing shives from the casing 11, or with air at atmospheric pressure if an exhaust system of removing shives from the casing 11 is employed, will issue, thereby providing a device which practically consists of streams of air defining a V-shaped trough into which the fibers 45 will be positively led into engagement with the corrugated rollers 66.

The function of the corrugated feeding rollers 66 is to feed the fibers 39 into association with combined combing and conveying elements 69. The corrugated feeding rollers 66 are provided with draft, that is, the peripheral speed of the corrugated feeding rollers 66 is in excess of the speed of travel of the fibers 45 as they are fed to the said feeding rollers. While the corrugated rollers 66 do this effectively, there is always the possibility that short end fibers 39 will be fed to the corrugated rollers 66 faster than such rollers are capable of taking care of same. This is particularly true with regard to the end of the stalks. For example when the stalk passes over the anvil 46, the first portion of the stalk is effectively operated on by the teeth 51 on the roller 49 due primarily to the fact that the stalk, as a stalk, is held by the corrugated feed rollers 13. When the end of a stalk passes beyond the control of the corrugated feed rollers 13, the teeth 51 of the decorticating roll rapidly feed the rest of the stalk over the anvil 46, and in a large percentage of cases the feeding action is so rapid that the decorticating action of the teeth 51 and anvil 46 is different with the result that the latter or "tail" portion of the stalk is not thoroughly decorticated. Such undecorticated or partially decorticated ends will pile up adjacent the opening between the corrugated rollers 66 and will be engaged by the bars 64 and drawn around with such bars so as to assume the position shown in Fig. 1.

Associated with the scutching roller 65 is a mechanism comprising a shaft 70 rotatably mounted in bearings 71 in the side frame members of the framework 10. On such shaft is secured a hub 72 having integrally formed radially and outwardly extending members 73. In each of the members 73 there is housed a bar or plate 74 which may be of resilient material, such as rubber, or balata, or may be made of any fibrous material, or of metal, and the ends of such members 74 are relatively square. The position of the structure just described with respect to the scutching roller 65 is such that the bars or plates 74 extend inwardly a considerable distance between adjacent bars 64, as clearly shown in Fig. 1.

The device just described is rotatable in the direction of the arrow shown in Fig. 1, or in the direction opposite to the direction of rotation of the roller 65, so that there is always a pull exerted on the partially undecorticated fibers 39 which are in engagement with the bars 64, and bars or plates 74, and, therefore, there is a stripping or decorticating action on the fibers 45 by the bars 64 and bars or plates 74. Also, in addition to such movement the fibers 45 referred to are being continually drawn backwardly against the feeding motion of the bars 64 and bars or plates 74 by the corrugated rollers 66. The effect is, therefore, that the fibers 45 referred to are effectively decorticated.

From the corrugated rollers 66 the fibers 45 are led to a condenser 74a and then to a combined combing and conveying device 69. The combined combing and conveying device 69 comprises essentially parallelly spaced endless conveyor chains 75 mounted on sprocket wheels 76 secured to shafts 77 and which shafts are arranged parallel to each other and rotatably mounted in bearing members 78 in the side frame members of the framework 10. Extending between the endless sprocket chains 75 are parallelly arranged bars 79, from each of which extends a row of pins 80. The upper reach of each pair of the endless sprocket chains 75 move at a slightly greater speed than the fiber 45 and in the direction of the arrow shown in Fig. 1, that is, in a direction to feed the fibers 45 to the right as shown in Fig. 1 toward the exit end of the machine.

There are two of the mechanisms above described, as clearly shown in Fig. 1, and the peripheral speed of the upper reach of the conveyor 75 of the one of said mechanisms nearest the condenser 74a is measurably greater than the peripheral speed of the corrugated feed rollers 66. Also the peripheral speed of the upper reach of the second of said conveyors 75 is greater than the peripheral speed of the upper reach of the first of said conveyors with the result that the rows of pins 80 on the parallelly arranged bars 79 exert not only a feeding action on the fiber 45, but also a distinct scutching and combing action thereon. The result is that the fibers 45 are cleaned of remaining shives and arranged substantially parallel to each other in their passage from the corrugated feed rolls 66 to the exit end of the machine.

In order to keep the fibers 39 down on the bars 70 I preferably provide the pipes 81, which are provided with a plurality of orifices along the length thereof, or with an elongated slot along the length thereof through which is fed air under pressure, or through which is drawn atmospheric air by reason of the vacuum or sub-atmospheric condition being set up in the casing 11 by the fan blower 78. This flow of the air striking the fibers 45 forces the same down into close engagement with the bars 79.

Associated with each of the conveyor elements 69 and adjacent to the entrance portion thereof is a roller 81a, and which roller is provided with a shaft 82. The ends of the shaft 82 extend into slots 83 in bars 84, secured to the inner face of the side frame members of the framework 10. The rollers 81a are, therefore, freely movable in accordance with the weight of the fibers 45, or the force exerted because of the speed of movement of such fibers and tend also, in advance of the air issuing from the pipes 81 to force the fibers 45 into engagement with the bars 79 and pins 80.

After passing from the combing and feeding device 69, the fibers 45 are led through corrugated rollers 14 on the exit end of the machine. Such corrugated rollers 14 also have the corrugations thereof relatively large, and such corrugations are preferably coated with a resilient material, such as rubber or balata. The rollers 14 rotate in the direction of the arrow shown and serve to feed the fibers 45 from the machine and into engagement with a sliver forming device, to be later described. The corrugated rollers 14 are positioned in an opening in the rear wall of the casing 11, and in order to preclude the emission of dust from the interior of the casing 11, and in order to prevent the entrance of air thereto from without the casing 11, except under certain conditions I have provided flaps 16 of resilient and elastic material which effectually performs the object desired.

Secured to the end wall of the casing 11 is a supporting member 85, on which is mounted a sliver forming device. This device is shown in Figs. 1 and 9 in side elevation partly, in section, and is shown in plan view in Fig. 11, and referring to such figures, the parallelly arranged fibers 45 as they pass from the casing 11 between the corrugated rollers 14 enter a condenser 86. The condenser 86 constricts the width of the layer of fibers 45, and such fibers in rather compact form pass under a roller 87 and over a grooved roller 88. The rollers 87 and 88 interengage with each other, the roller 88 being provided with an annular groove in its periphery and into which fits the roller 87. The rollers 87 and 88 further act to compress the fibers 45, and such fibers now pass onto a conveying and combing arrangement. The roller 88 is mounted on the bracket 85 and the roller 87 is rotatably mounted on a shaft carried by pivoted arms 92 that in turn are secured to a shaft 89. A lever 90, secured to the pivoted arms 92 is provided with an adjustable weight 91, which may be moved longitudinally of the lever 90 and thus there is provided a means for adjusting the pressure exerted by the roller 87 on the fibers 45.

Throughout all the travel over the combing conveyors 69 of the stalks or fiber 45 the shives or matter other than the fibrous matter are being continually beaten and removed therefrom, with the result that the fibrous material as it emerges from between the rollers 87 and 88 is completely decorticated. Actual tests have shown that the decorticated fiber is in condition to be used directly for the making of thread, fabric, cordage, or the like. Also, it has been found that the loss of fibrous material by this improved machine is reduced to a minimum.

The casing 11 is preferably rendered as airtight as possible by means of the various constructions and arrangement of the devices above described. This not only eliminates the dust which is inherent in the operation of a machine of this kind, but also makes it possible to better control the disposition of the heretofore waste product, as well as to accelerate the rate of removal of the shives and other foreign matter from the working parts of the machine, as well as from the fibrous material itself. As heretofore described, therefore, a blower or suction device 18 is connected to a conduit 17 which in turn communicates with the interior of the casing 11 at substantially the lowermost part thereof, as clearly shown in Fig. 1. Also, as heretofore described, the fan creates a movement of air from all parts of the machine into the conduit 17, and where the device 17 is of relatively large size a tremendous amount of air is removed per unit of time from the casing 11. I find it advantageous, also, as above described, to provide a means for increasing the amount of air, either atmospheric or under pressure, delivered to and removed from the interior of the casing 11. Such means comprises the pipes 68 and the pipes 19, which pipes not only assist, as in the case of the pipe 68, in forming practically an air envelope through which the fibrous material 45 is positively led, but also acts on the fibers 45 to force the same into intimate engagement with the conveyors 69, as well as positively blowing and directing the shive portions away from the decorticating wheels and from other instrumentalities in the machine. Also, to facilitate the removal of shives and other foreign matter from the casing 11 I provide adjacent the bottom of casing 11, and beneath the conveyors 69, as well as beneath the corrugated rollers 66, an endless conveyor belt 93, which endless conveyor belt has its upper reach lying in substantially a horizontal plane and moving in the direction of the arrow shown. The endless conveyor belt 93 passes over rollers 94, secured to shafts 95 rotatably mounted in suitable bearings on the framework 10.

Figure 6:
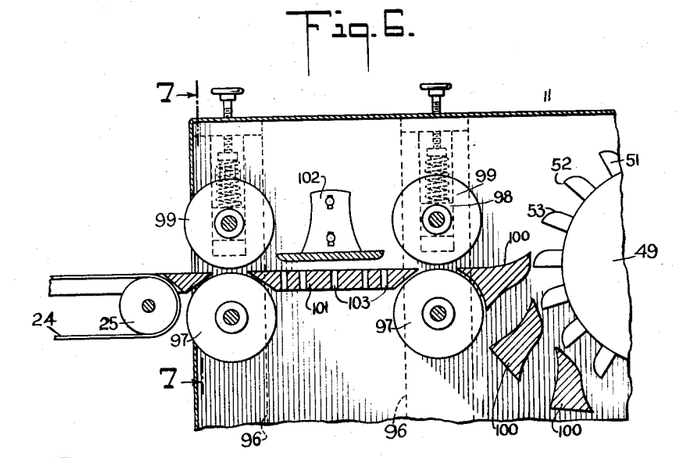
Fig. 6 is a view in sectional elevation, and on a relatively enlarged scale, of a modified construction of that portion of the stalk conveying means and feeding rolls located between the section lines 4—4 and 5—5 of Fig. 1.
Figure 7:
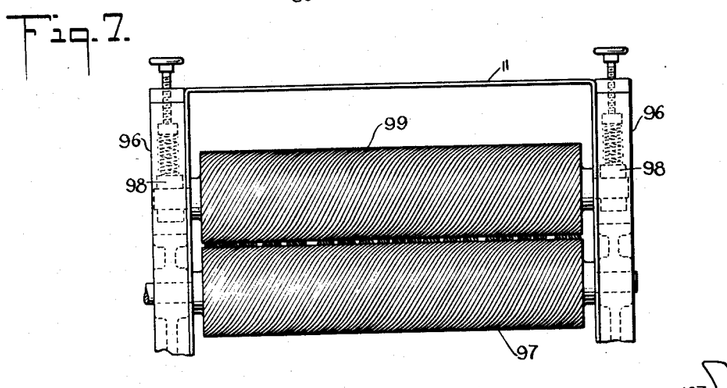
Fig. 7 is a view in sectional elevation on the line 7—7 of Fig. 6.

In the embodiment of the invention shown in Fig. 1, and above described, there are employed two of the corrugated rollers 13. Two such rollers form a unit through which the stalks 39 are passed and in passing such stalks are provided with corrugations extending transversely thereof to facilitate the removal of the shives from the fibers in the subsequent operations of the machine. However, under certain circumstances it may be preferable to utilize a plurality of such pairs of corrugated rollers 13 or similar rollers having the same or equivalent function and such an alternative construction is illustrated in Figs. 6 and 7. Referring to Figs. 6 and 7, there is shown a feeding and corrugating unit which may be substituted for the single unit composed of the corrugated rollers 13 in Fig. 1 or in Fig. 9. In Fig. 6 the casing 11, at the point adjacent to the roller 49 carrying the radially extending members or teeth 51 is provided with spaced uprights 96 in which are formed bearings having rotatably mounted therein the shafts of lower rollers 97. Also the uprights 96 have slidably mounted therein aligned bearing members 98 in which is rotatably mounted the shaft ends of an upper roller 99. There are thus two rollers 99 and 97 working in unison and there is provided a plurality of such pairs as clearly shown in Fig. 6, such pairs being separated by as great a distance as may be desired.

The rollers 97 and 99 are provided on their peripheral surface with corrugations formed helically in such surface, as clearly shown in Fig. 7. I have found that the corrugations or grooves not only act to form notches extending substantially transversely of the length of the fibers 39, but also such rollers because of the helical corrugations exert a rolling or twisting effect on the fibers which tend to crush the shive portion of the stalks 39 into fragments parallel to the length of the stalks and of a length equal to the distance between consecutive corrugations.

Associated with the pair of rollers 97 and 99 nearest the roller 49, carrying the radial arms or teeth 51, is an anvil 100 and such anvil is adjustable and similar in function to the anvil 46 above described with respect to Fig. 1. In addition, however, the anvil 100 may form a single unit or may form one of a group of separate anvils, each of the anvils being separated from the others. I have preferred, in the showing of Fig. 6, to utilize a group of separate anvils, and in the present instance have shown a group of three of such anvils arranged in operative relation to the radial arms or teeth 51 carried by the decorticating roller 49. I have found that with a structure employing a plurality of anvils the decorticating effect of the radial arms or teeth 51 on the fibers 39 is much superior to a construction wherein but a single anvil, as the anvil 100. is employed. The radial arms or teeth 51 appear to have a combing as well as breaking effect on the shive portion of the fibers.

The distance between the pairs of rollers 97, 99 may be anything desired, and proportionally speaking the distance between such pairs of rollers shown in Fig. 7 has been found satisfactory. Between such rollers and in substantial alignment with a plane lying tangential to the circumference of the upper portion of the lower rollers 97 is a platform 101 over which the fibers 39, as they pass between the pair of rollers 97, 99, at the left of Fig. 6, are fed toward and into the space between the right hand pair of rollers 97, 99.

As there is a tendency on the part of the stalks 39 after passing through the first pair of rollers 97, 99, to curl upward and thus be unable to pass into the space between the right hand pairs of rollers 97, 99, I find it advisable to place a presser foot 102 spaced from but adjacent to the platform 101, to define a throat through which the stalks 39 are positively led or guided from the left hand pair of rollers 97, 99 into engagement with the right hand pair of rollers. As dirt and dust are always being given or driven off from the fibers 39, I have provided the platform 101 with a plurality of holes 103 through which such dirt or dust may pass downward toward the bottom of the machine.

Figure 8:
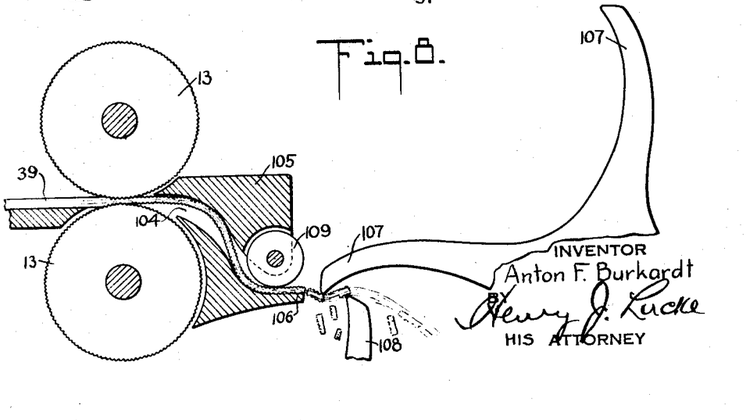
Fig. 8 is a section of a pair of feeding rolls and a modified form of decorticating element having interposed therebetween a modified form of throat or chute through which the stalks are fed to the decorticating element.

In place of the anvil 46 and freely movable weight 47, as illustrated in Fig. 2, I may substitute the construction shown in Fig. 8, wherein the corrugated feed rollers 13 feed the fibers 39 through a curved throat 104 formed in an anvil block 105. The exit end of the throat 104, as indicated by the reference numeral 106, cooperates either with the radially extending arms or teeth 51 on the roller 49 or with the substantially radial arms 107 and 108, on a modified form of decorticating roller. At such exit end 106 is located a rotatable roller 109 which guides the corrugated fiber 39 into engagement with the decorticating elements 107.

The fibers 39 are taken from sheafs and are placed on the platform 20 with the majority of the stalks or fibers 39 extending in the general direction of their proposed movement through the machine. From the platform 20 such stalks or fibers pass onto the endless conveyor belt 24 and are moved by such belt to the right as viewed in Fig. 1 where they will encounter the block 38, and such block in accordance with its height above the endless conveyor 24 will determine the amount of stalks of fiber 39 to pass under the same as a unit.

That number of stalks of fiber 39 which pass under the block 38 will be engaged by the grooved roller 31, such as is shown in detail in Fig. 4, and the roller having a reciprocating motion transversely of the length of the stalks and of the direction of travel thereof will roll out, and even the same as clearly shown in Fig. 4, disposing the stalks over practically the entire width of the conveyor 24.

The evened-out layer stalks or fibers 39 will continue their movement along with the endless conveyor 24 and will meet a second block 38 which again reduces the number of stalks which will pass along with the conveyor 24 and will encounter for the second time a roller 31 which evens out the stalks and arranges them in practically a single layer on the endless conveyor 24. The stalks will then pass from the conveyor 24 into the space between the cooperating corrugated feed rollers 13, which are rotated in the direction of the arrow shown, and in their passage through such corrugated rollers will have grooves or notches cut therein practically transversely of the length of the stalks, and as the stalks pass beyond the cooperating coordinated rollers 13 they pass onto and over the anvil 46.

As the stalks pass over the edge of the anvil 46 they are engaged by the radially extending arms or teeth 51 carried by the roller 49, which is rotatably mounted on the shaft 50 and rotated in the direction of the arrow shown in Fig. 1 by any appropriate means. The radially extending arms or teeth 51 strike or pinch the stalk between the end of the teeth 51 and the end of the anvil 46 with the result that the shives, designated by the numeral 59, are snapped off the stalks of fiber 39 leaving practically only the fibrous material of the stalks 39 intact.

The stalks of fiber 45 now relieved of a large percentage of the shives 59 are moved downwardly with the radially extending bars or plates 64 of a decorticating beater constructed substantially in accordance with the showing in Fig. 10, and above described. The bars or plates 64 practically intermesh with the radially extending arms as shown in Fig. 1 and therefore the fibrous material 45 travels through a sinuous path, as shown. In such movement the stalks are flexed backwards and forwards, further loosening any shives 59 that may have adhered to the stalks of fiber 45.

The radially extending arms or teeth 51 striking the stalks of fiber 39 will so act on the stalks as to cause the same to lift up from the anvil 41 a slight distance and therefore in order to insure that such stalks are kept in operative position with respect to the anvil 46 there is provided, as above described, the freely movable bar 47 the weight of which overcomes the tendency of the stalks of fiber 39 to lift up from the anvil 46.

The shives 59 which are removed from the stalks of fiber 39 by the radially extending arms or teeth 51, drop downwardly by their own weight in the general direction as shown by the arrows in Fig. 1, such movement being accelerated by the exhausting of air through the conduit 17 by means of the fan 18.

After the stalks of fiber 45 pass beyond the roller 49 and decorticating beating wheel 65, they are headed toward the corrugated rubber covered rollers 66 which intermesh with each other as shown. To effect the positive entrance of such stalks of fiber 45 in the space between the corrugated rollers 66, I have supplied the tubular members 68 each provided with a plurality of perforations or with a slot extending along the length thereof the perforations or slots being so positioned relative to each other that the air under pressure issuing therefrom will form practically a compressed air funnel.

This construction positively insures the movement of the end of the stalks of fiber 45 into the space between the corrugated feed rollers 66 and such rollers act to feed the stalk onwardly to the right of the structure shown in Fig. 1. The speed of rotation of the corrugated feed roller 66 is in timed relation to the speed of rotation of the corrugated feed rollers 13, to produce draft on the fibers and the stalks of fiber 45 are thus positively fed to the right of the machine.

When any individual stalk of fiber 45 is considered, it will be apparent that while such stalk is being fed through the corrugated feed rollers 66, the rear end thereof may have a tendency to fall downwardly and be carried around by the decorticating beater wheel 65 and in doing so it will be apparent that such stalk will be engaged by the bars 64 and also by the radially extending arms 74 of the element 72 carried by the shaft 70 which rotates in the direction of the arrow shown. However, as the stalk is being fed onward by means of the corrugated feed rollers 66 the end of the stalk will be drawn back from its position between the beater roll 65 and the member 72 with the result that the radial arms 74, and particularly the arms 74 will cooperate to clear off from the stalk of fiber 45 any shives that may adhere thereto and such shives will fall of their own weight downwardly and into the conduit 17.

The now practically completely decorticated stalks of fiber 45 are led onto the first of a plurality of combing conveyors 69 and the surface speed of such first conveyor is slightly in excess of the speed of movement of the stalks of fiber 45 as they are delivered thereto, with the result that the teeth 80 on the cross bars of such conveyor will comb the fibers, making the same lie practically parallel to each other and removing therefrom any shives that may still adhere thereto. The surface speed of the second of such conveyors 69 is slightly in excess of the surface speed of the first of said conveyors, with the result that a further combing and paralleling action is had on the fibers.

In order to insure that the decorticated fibers move into engagement with the teeth 80, I have placed, adjacent to the point of entrance of such fibers with the conveyors 69, a roll 81a which is slidably mounted in a slotted member 84 and which aids in forcing the fibrous material into engagement with the teeth 80. Also and as a further precaution I provide a tube 81 extending transversely of the direction of movement of the fibers and provide the same with a plurality of perforations or with a slot extending throughout the length of the tube 81, and with perforations or slot so positioned as to direct compressed air passing through such tube onto the fibers and thus not only assist in forcing the same into engagement with the teeth 80 but also blow off from such fibers any shives that may be still adhering thereto, and any dust which may be held thereon.

From the second combing conveyor 69 the fibers may pass if thought necessary or desirable, to a still further duplicate of such structure, coming finally into engagement with corrugated feeding rolls 14 which, being positively driven, feed the fibers from the machine into a condenser 86 which again materially reduces the width of the layer of fibers and guides the same through the sliver forming rollers 87 and 88 in the form of a sliver, which sliver is disposed of in the usual manner for further operations thereon.

The actual decorticating mechanism employed in the structure shown in Fig. 1 is but one of a number which may be employed by me and which comes within the scope of my present invention. Another form of decorticating mechanism is illustrated in Fig. 9, and referring to such figure there is illustrated the casing 11 which contains the decorticating mechanism and at the entrance end of which is located the corrugated feed rollers 13 and which feed rollers are associated with an endless conveyor belt 24 for delivering the stalks of fibrous material thereto.

At the exit end of the corrugating feed rollers 13 is an anvil 110 which positions the stalks of fiber 39 in association with the decorticating mechanism to be described. In the framework 10 are arranged parallel sets of bearings, in each set of which is mounted a shaft 111. The shafts 111 have mounted thereon for rotation with respect thereto, a decorticating element, and as the decorticating elements on the shafts 111 are identical, but one of such structures will be described.

Rotatably mounted on the shaft 111 are circular plates 112 spaced apart from each other and held in spaced apart and rigid condition by shafts 113 equally spaced on a circle of which the shaft 111 is the axis. On the shafts 113 are rotatably mounted scutching elements 116. The construction of the scutching devices and the manner in which they operate is clearly described and illustrated in the patent granted to David E. Patterson on May 11, 1937, under No. 2,079,661. The scutching elements 116 are shown in section in Fig. 9 and it will be noted that they each comprise the diametrically arranged projections 117 and that the portion of the material forming the scutching element 116 between the elements 117 is notched as indicated by reference numeral 118. The notched portions 118 cooperate with the projections 117 of associated scutching elements 116, as will be hereinafter described.

If desired there may be a plurality of the notches 118, rather than the single one shown in Fig. 9, although such construction is optional. As the scutching devices rotate on the shafts 111 the scutching elements 116 rotate independently thereof on the shafts 113. With respect to the uppermost structure shown in Fig. 9, the projections 117 will be brought successively into position to cooperate with the end of the anvil 110 and perform the scutching operation on the stalks of fiber 39, removing therefrom the sections 59 of shives which are illustrated in Fig. 9 as small rectangles and which drop to the bottom of the casing 11 and pass into the conduit 17.

The second lowermost scutching element assembly shown in Fig. 9 and mounted on the other shaft 111 has the scutching element 116 thereon cooperating with the scutching elements 116 on the uppermost assembly just described and forms a sinuous path through which the partially decorticated stalks of fiber 39 are led, and such stalks are brought into association with a scutching roller 65 with which is associated the member 72 having thereon a plurality of radially extending plates or bars 74, such structure being similar to the corresponding structure shown in Fig. 1. The radially extending bars or plates 74 cooperate with the radially extending plates 64 and the scutching wheel 65 to form a sinuous path through which is led the partially decorticated stalks of fiber 39. Such stalks are then led between the pair of cooperating corrugated rubber covered feed rollers 66, these being identical in construction and function with the corresponding elements shown in Fig. 1. From the corrugated feed rollers 65, the stalks of fibers 45 pass through the same set of operations and the same mechanism as shown in Fig. 1, and therefore need not be further described in detail.

As the stalks are partially decorticated by the decorticating elements 116, the decorticated end thereof, which is the advance end, passes between the members 65 and 72 and are brought into association with the corrugated feed rollers 66. It is preferable that the portion of the stalks of fiber 39 between the members 65 and 72 on the one end and the corrugated feed rollers 66 be slack, as indicated by the bight in Fig. 9. This is desirable as the cooperative action of the decorticating elements 116 will cause the stalks of fiber 39 between the corrugated feed rollers 13 and the feed rollers 66 to be alternately slackened and then tensioned with the result that the stalks of fiber 39 are drawn slightly back from between the members 72 and 65 with each tensioning of the stalks of fiber 39 by decorticating elements 116 and this will occur regardless of the fact that the members 72 and 65 are continually rotating in the direction of the arrow shown.

It is preferable that the plates or bars 64 have their outer peripheral edge square or substantially square, and also that the outer peripheral edge of the radially extending plates or bars 74 also be substantially square. This construction is clearly indicated in Fig. 9. From an inspection of such Fig. 9, it will be noted that the stalks of fiber 39 pass along an angular sinuous path and therefore there is given a flexing movement to the stalks of fiber 39. This action has the effect of loosening the shives 59 from such stalks of fiber, and therefore when the stalks of fiber 39 are pulled back slightly through the members 72 and 65 such loosened shives are readily separated from the stalks 39.

Associated with the second lowermost decorticating device above described with respect to Fig. 9, there is a third decorticating device 119 which has decorticating element 116 thereon and which is mounted on the shaft 120. I find the use of the decorticating device 119 extremely desirable, as there is a tendency on the part of the second lowermost decorticating device, because of its speed of rotation as compared with the speed of movement of stalks of fiber 39, to whip out the rear end of the stalks 39 and carry the same around with the decorticating elements 116 and such whipped out end assumes the position shown in Fig. 9.

The decorticating elements 116 will exert a drag on the partially decorticated ends of the stalks of fiber 39 and also will exert a decorticating effect on such ends. Also the corrugated feed rolls 66 will drag the partially decorticated ends of the stalks of fiber 39 from between the cooperating decorticating elements 116 and in such movement will pull the same through the sinuous path between the cooperating elements 74 and 64 and feed the same as above described. This particular feature of my invention is of extreme importance as it insures that the stalks of fiber 39 will be decorticated throughout their entire length.

As the operation of the structure shown in Fig. 9 is identically the same as that shown in Fig. 1, such operation will not be described in detail.

The arrangement of scutching rollers 65 in cooperation with the radial arms or teeth 51 on the roller 49 as shown in Fig. 1 is but one of the satisfactory arrangements which come within the scope of my present invention. In one such arrangement such as is shown in Fig. 12 I have disassociated the scutching or beater roller 65 entirely from the radial arms or teeth 51 on the roller 49 and therefore feed the stalks of fiber 39 over the anvil 46, or a plurality of such anvils, arranged seriatim as shown in such Fig. 12 and which anvils cooperate with the radially extending arms or teeth 51 on the roller 49. Arranged parallel to the shaft 50 carrying the roller 49 is a shaft 121 on which is mounted a scutching roller 126 similar to the scutching roller 65 as shown in Figs. 1 and 10, and associated with such scutching roller 126 is a scutching roller 122. The scutching roller 122 is similar to the scutching roller 73 shown in Fig. 1. The scutching roller 122 is equipped with radially extending bars or plates 123 which intermesh with and cooperate with the radially extending plates or bars 127 on the scutching roller 126. The stalks of fiber 39 are partially decorticated by the radially extending arms or teeth 51 on the wheel 49 and the plurality of anvils 46 and the stalks of fiber 39 as they leave such anvils 46, and before they come into engagement with the cooperating radial members 127 and 123 respectively on the scutch rollers 126 and 122 respectively, pass under a weighted roller 124 which causes the stalks of fiber 39 to be flexed and further tend to loosen such shives as may still be adhering to the stalks of fiber 39.

The radially extending arms 123 on the scutching device 122 extend into the spaces between the radially extending arms 127 of the scutching roller 126 to such an extent that they protrude into the interior of the scutching roller 126 a greater distance than the length of the radially extending arms 127, with the result that there is formed a sinuous path of marked angularity and which path is taken by the stalks of fiber 39. Reference is had to Fig. 12, wherein this is clearly shown and where it will be apparent that as the stalks of fiber pass over the square corners of the radially projecting arms 123 of the decorticating rollers 122 that the said stalks will be flexed and there will be a tendency on the part of the shive portions 59 to spring away from the stalks, particularly at the corner of the radially extending plates or bars 123.

To take advantage of this characteristic and function of the machine as thus far described, I preferably mount within the cylindrical space formed by the radially extending bars or plates 127 and on the shaft 121, a hub 125 having extending radially outward therefrom a plurality of arms 128 and such arms have attached thereto, or formed integral therewith, bars 129 which extend parallel to the shaft 121 and which are slightly spaced apart from the inner ends of the plates or bars 127.

On each of the bars 129 I provide, either a plurality of brush bristles 130, or a solid resilient and flexible plate, and in either event the brush elements 130 carried by the bars 129 will engage with the protruding shive portion 59 upon rotation of the arms 128 about the shaft 121 in the direction of the arrow shown in such Fig. 12.

I may employ a plurality of the scutching rollers 122 arranged symmetrically about the axis of the scutching roller 126, as clearly shown in the drawings. The scutching roller 122, adjacent to the topmost scutching roller 122, shown in Fig. 12, has the fibers 39 passing along the sinuous path formed by said scutching roller 122 and the scutching roller 126, and such fibers 39 pass downwardly between corrugated feed rollers 131. Between the uppermost scutching roller 122 and the scutching roller 122 just referred to is an air blast means 132 which blows on the fibers 39 in engagement with the outer edges of the radially extending arms or plates 127 on the scutching roller 126 and keeps such fibers in engagement with said bars or plates, as well as blowing therefrom any dust, dirt or loose shives.

There is a tendency for the fibers 39, and particularly the ends thereof, as they pass the second of said scutching rollers 122 to adhere to the bars or plates 127 on the scutching roller 126 and therefore such fibers or ends thereof will be drawn along by said plates or bars 127 and will be engaged by the bars 123 of a third scutching roller 122, as shown in Fig. 12. The feeding rollers 131, however, being in engagement with such fibers 39 will feed the same backward from between the bars or plates 127 and the bars 123 and down and between the feeding rollers 131 and a scutching operation will be performed on the fibers 39 during such movement.

The fibers 39 are fed from the feeding rollers 131 into and through a condenser 133 and between cooperating sliver forming rollers 134 and 135, and the fibers 45, now in the form of a sliver, are fed onto a series of endless conveying and combing conveyors 69 such as have been described above with respect to the construction shown in Figs. 1 and 9. After being delivered from the last one of the series of endless conveying and combing conveyors 69, the fibers 45, which have by this time become slightly disarranged from the sliver form, are again passed through a condenser 136.

From the condenser 136 the fibers 45 are passed through a pair of sliver forming rollers 138 and 139 and are then led to a series of pairs of feeding rollers 140, 141, 142, etc., the speed of the first of said pair of feeding rollers 140 being greater than the speed with which the fibers 45 are fed thereto, and the speed of each succeeding pair of rollers 141, 142, etc. being greater than the speed of the preceding pair of rollers in the series. The result is that while the sliver form of fibers 45 is maintained, it is in rather attenuated form after delivery from the last of the series of pairs of rollers 140 to 142, etc. The attenuated sliver of fibers 45 is passed over a platform, block or anvil 143 with which cooperates a reciprocating shearing knife 144, which cuts the fibers 45 into lengths. The shearing knife 144 is operated in synchronism with the speed of rotation of the last of the series of pairs of feeding rollers 140 to 142, etc., by means of appropriate gearing, such as the endless chain 145.

By properly proportioning the sprockets on which the endless sprocket chain 145 is mounted, the length of the cut sections 146 of the fibers 45 can be accurately determined and also adjusted or varied within appropriate limits. For textile purposes it is desirable that the length of the cut fibers 146 be approximately from 4 to 6 inches and therefore the shearing knife 144 is so adjusted as to provide for this contingency. The cut sections 146 as they fall under the action of the shearing knife 144 strike a deflecting plate 147 and are deposited in a suitable container as 148 from which they are carried to any suitable place for subsequent operations thereon.

Whereas I have described my invention by reference to specific forms thereof, it will be understood that many changes and modifications may be made without departing from the spirit of the invention.

I claim:

1. An apparatus for treating fibrous material comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, and a scutching wheel cooperating with the anvil to flex the fibrous material and simultaneously remove the loosened shives therefrom.

2. An apparatus for treating fibrous material, comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, a scutching wheel cooperating with the anvil to flex the fibrous material and simultaneously remove the loosened shives therefrom, a scutching and feeder roller associated with the scutching means and forming therewith a sinuous path for further flexing the fibrous material and removing the shives therefrom and a pair of feeding rollers operating to receive the fibrous material from the scutching device, and means associated with the feeding rollers for condensing and forming the fibers into sliver form.

3. An apparatus for treating fibrous material, comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, a scutching wheel cooperating with the anvil to flex the fibrous material and simultaneously remove the loosened shives therefrom, a scutching and feeder roller associated with the scutching means and forming therewith a sinuous path for further flexing the fibrous material and loosening the shives therefrom and a pair of feeding rollers operating to receive the fibrous material from the scutching device, means associated with the feeding rollers for condensing and forming the fibers into sliver form and a scutching device cooperating with the scutching roller for receiving and scutching the fibrous material carried around by the scutching roller beyond the feeding rollers.

4. An apparatus for treating fibrous material, comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, a scutching wheel cooperating with the anvil to flex the fibrous material and simultaneously remove the loosened shives therefrom, a scutching and feeder roller associated with the scutching means and forming therewith a sinuous path for further flexing the fibrous material and loosening the shives therefrom and a pair of feeding rollers operating to receive the fibrous material from the scutching device, means associated with the feeding rollers for condensing and forming the fibers into sliver form, a scutching device cooperating with the scutching roller for receiving and scutching the fibrous material carried around by the scutching roller beyond the feeding rollers, and a series of combing and conveying means for receiving the fibers in sliver form and simultaneously feeding and combing the fibrous material.

5. An apparatus for treating fibrous material, comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, a scutching wheel cooperating with the anvil to flex the fibrous material and simultaneously remove the loosened shives therefrom, a scutching and feeder roller associated with the scutching means and forming therewith a sinuous path for further flexing the fibrous material and loosening the shives therefrom and a pair of feeding rollers operating to receive the fibrous material from the scutching device, means associated with the feeding rollers for condensing and forming the fibers into sliver form, a scutching device cooperating with the scutching roller for receiving and scutching the fibrous material carried around by the scutching roller beyond the feeding rollers, a series of combing and conveying means for receiving the fibers in sliver form and simultaneously feeding and combing the fibrous material, and means for operating each succeeding combing conveyor at a greater speed than the preceding combing conveyor.

6. An apparatus for treating fibrous material, comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, a scutching wheel cooperating with the anvil to flex the fibrous material and simultaneously remove the loosened shives therefrom, a scutching and feeder roller associated with the scutching means and forming therewith a sinuous path for further flexing the fibrous material and loosening the shives therefrom and a pair of feeding rollers operating to receive the fibrous material from the scutching device, means associated with the feeding rollers for condensing and forming the fibers into sliver form, a scutching device cooperating with the scutching roller for receiving and scutching the fibrous material carried around by the scutching roller beyond the feeding rollers, a series of combing and conveying means for receiving the fibers in sliver form and simultaneously feeding and combing the fibrous material, and means for operating each succeeding combing conveyor at a greater speed than the preceding combing conveyor, the speed of the first of said combing conveyors being greater than the speed of the fibers as delivered thereto.

7. An apparatus for treating fibrous material, comprising in combination, a table, a conveying means forming part thereof and adapted to convey said material along the length of the table, a dam located above said table and determining the depth of the layer of the fibrous material being carried along the table by the conveyor, means associated with said dam and with said conveyor for leveling off the layer of material passing under said dam, a combined feeding and corrugating means at the end of said table for simultaneously crushing the fibrous material and forming notches transversely of the material along the length thereof, an anvil located at the exit end of said combined feeding and corrugating means and on which the crushed and notched fibers are fed, a scutching wheel cooperating with the anvil to flex the fibrous material and simultaneously remove the loosened shives therefrom, a scutching and feeder roller associated with the scutching means and forming therewith a sinuous path for further flexing the fibrous material and loosening the shives therefrom and a pair of feeding rollers operating to receive the fibrous material from the scutching device, means associated with the feeding rollers for condensing and forming the fibers into sliver form, a scutching device cooperating with the scutching roller for receiving and scutching the fibrous material carried around by the scutching roller beyond the feeding roller, a series of combing and conveying means for receiving the fibers in sliver form and simultaneously feeding and combing the fibrous material, means for operating each succeeding combing conveyor at a greater speed than the preceding combing conveyor, the speed of the first of said combing conveyors being greater than the speed of the fibers as delivered thereto, and a feeding means associated with the length of the series of combing conveyors and means associated therewith for receiving the same and transforming the fibers into sliver form.

8. An apparatus for treating fibrous material such as flax, sisal, ramie and the like, comprising in combination an anvil, a scutching wheel associated therewith, means for preparing and feeding fibrous material to the associated anvil and scutching wheel, a beater roll associated with the scutching wheel and forming a sinuous path through which the fibrous material is fed from the anvil, means for rotating the scutching wheel and beater roll in opposite directions at a surface speed greater than the rate of movement of the fibrous material thereto, feeding rolls for receiving the fibrous material after its passage through the sinuous path, means for driving the feeding wheels at a surface speed greater than the speed of delivery of the fibers thereto.

9. An apparatus for treating fibrous material comprising in combination an anvil, a scutching wheel associated therewith, means for preparing and feeding fibrous material to the associated anvil and scutching wheel, a beater roll associated with the scutching wheel and forming a sinuous path through which the fibrous material is fed from the anvil, means for rotating the scutching wheel and beater roll in opposite directions at a surface speed greater than the rate of movement of the fibrous material, a scutching wheel associated with the beater roll and forming with said beater roll a sinuous path in which is led fibrous material carried around by the beater roll, feeding rolls for receiving the fibrous material after its passage through the sinuous path, means for driving the feeding rolls at a surface speed greater than the speed of delivery of the fibers thereto, and means for combing and paralleling the fibers as received from the feeding rolls.

10. An apparatus for treating fibrous material comprising in combination an anvil, a scutching wheel associated therewith, means for preparing and feeding fibrous material to the associated anvil and scutching wheel, a beater roll associated with the scutching wheel and forming a sinuous path through which the fibrous material is fed from the anvil, means for rotating the scutching wheel and beater roll in opposite directions at a surface speed greater than the rate of movement of the fibrous material, feeding rolls for receiving the fibrous material after its passage through the sinuous path, air pressure means for positively guiding the fibrous material as it comes from the scutching wheel and beater roll into association with the feeding rolls, a condenser for receiving the fibrous material from the feeding rolls and forming the fibers into a sliver, drawing conveyors movable at a speed greater than the speed of delivery of the fibers thereto for combing and paralleling the fibers of the sliver, and means for severing the fibers into pieces of predetermined length.

11. An apparatus for treating fibrous material comprising in combination a stationary anvil, a rotatably mounted scutching wheel cooperating therewith, combined feeding and fibrous material preparing means for preparing the fibers and feeding the same to the associated anvil and scutching wheel, means for maintaining the fibers in association with the anvil during the scutching operation by the scutching wheel, a breaker roll associated with the scutching wheel and forming therewith a sinuous path through which the partially scutched fibers are led, means for rotating the scutching wheel and breaker roll at the same speed in opposite directions and at a speed greater than the speed of delivery of the fibrous material thereto, whereby a combing and scutching action is obtained on the fibers, feeding wheels for receiving the scutched fibers as they emerge from the sinuous path, an air pressure means for positively leading the fibers to the feeding wheels, a scutching wheel associated with the breaker roll and cooperating therewith to form a sinuous path in which is led the fibers or portions thereof carried around by the breaker wheel, said last named scutching wheel and breaker roll rotating at the same speed in opposite directions and performing a combing and scutching operation on the fibers, a condenser for receiving the fibers from the feeding wheel and a series of combing conveyors, the speed of each of the combing conveyors being greater than the speed of delivery of the fibrous material thereto.

12. An apparatus for treating fibrous material comprising in combination a stationary anvil, a rotatably mounted scutching wheel cooperating therewith, combined feeding and fibrous material preparing means for preparing the fibers and feeding the same to the associated anvil and scutching wheel, means for maintaining the fibers in association with the anvil during the scutching operation by the scutching wheel, a breaker roll associated with the scutching wheel and forming therewith a sinuous path through which the partially scutched fibers are led, means for rotating the scutching wheel and breaker roll at the same speed in opposite directions and at a speed greater than the speed of delivery of the fibrous material thereto, whereby a combing and scutching action is obtained on the fibers, feeding wheels for receiving the scutched fibers as they emerge from the sinuous path, an air pressure means for positively leading the fibers to the feeding wheels, a scutching wheel associated with the breaker roll and cooperating therewith to form a sinuous path in which is led the fibers or portions thereof carried around by the breaker wheel, said last named scutching wheel and breaker roll rotating at the same speed in opposite directions and performing a combing and scutching operation on the fibers, a condenser for receiving the fibers from the feeding wheel, a series of combing conveyors, the speed of each of the combing conveyors being greater than the speed of delivery of the fibrous material thereto and the speed of each succeeding combing conveyor being greater than the speed of the preceding combing conveyor.

13. An apparatus for treating fibrous material comprising in combination a stationary anvil, a rotatably mounted scutching wheel cooperating therewith, combined feeding and fibrous material preparing means for preparing the fibers and feeding the same to the associated anvil and scutching wheel, means for maintaining the fibers in association with the anvil during the scutching operation by the scutching wheel, a breaker roll associated with the scutching wheel and forming therewith a sinuous path through which the partially scutched fibers are led, means for rotating the scutching wheel and breaker roll at the same speed in opposite directions and at a speed greater than the speed of delivery of the fibrous material thereto, whereby a combing and scutching action is obtained on the fibers, feeding wheels for receiving the scutched fibers as they emerge from the sinuous path, an air pressure means for positively leading the fibers to the feeding wheels, a scutching wheel associated with the breaker roll and cooperating therewith to form a sinuous path in which is led the fibers or portions thereof carried around by the breaker wheel, said last named scutching wheel and breaker roll rotating at the same speed in opposite directions and performing a combing and scutching operation on the fibers, a condenser for receiving the fibers from the feeding wheel, a series of combing conveyors, the speed of each of the combing conveyors being greater than the speed of delivery of the fibrous material thereto and the speed of each succeeding combing conveyor being greater than the speed of the preceding combing conveyor, and means for forcing and retaining the fibrous material in association with the combing conveyors.

14. An apparatus for treating fibrous material comprising in combination a stationary anvil, a rotatably mounted scutching wheel cooperating therewith, combined feeding and fibrous material preparing means for preparing the fibers and feeding the same to the associated anvil and scutching wheel, means for maintaining the fibers in association with the anvil during the scutching operation by the scutching wheel, a breaker roll associated with the scutching wheel and forming therewith a sinuous path through which the partially scutched fibers are led, means for rotating the scutching wheel and the breaker roll at the same speed in opposite directions and at a speed greater than the speed of delivery of the fibrous material thereto, whereby a combing and scutching action is obtained on the fibers, feeding wheels for receiving the scutched fibers as they emerge from the sinuous path, an air pressure means for positively leading the fibers to the feeding wheels, a scutching wheel associated with the breaker roll and cooperating therewith to form a sinuous path in which is led the fibers or portions thereof carried around by the breaker wheel, said last named scutching wheel and breaker roll rotating at the same speed in opposite directions and performing a combing and scutching operation on the fibers, a condenser for receiving the fibers from the feeding wheel, a series of combing conveyors, the speed of each of the combing conveyors being greater than the speed of delivery of the fibrous material thereto and the speed of each succeeding combing conveyor being greater than the speed of the preceding combing conveyor, means for forcing and retaining the fibrous material in association with the combing conveyors, and means for re-forming the fibrous material into sliver form after delivery from the combing conveyors.

15. An apparatus for treating fibrous material comprising in combination a stationary anvil, a rotatably mounted scutching wheel cooperating therewith, combined feeding and fibrous material preparing means for preparing the fibers and feeding the same to the associated anvil and scutching wheel, means for maintaining the fibers in association with the anvil during the scutching operation by the scutching wheel, a breaker roll associated with the scutching wheel and forming therewith a sinuous path through which the partially scutched fibers are led, means for rotating the scutching wheel and breaker roll at the same speed in opposite directions and at a speed greater than the speed of delivery of the fibrous material thereto, whereby a combing and scutching action is obtained on the fibers, feeding wheels for receiving the scutched fibers as they emerge from the sinuous path, an air pressure means for positively leading the fibers to the feeding wheels, a scutching wheel associated with the breaker roll and cooperating therewith to form a sinuous path in which is led the fibers or portions thereof carried around by the breaker wheel, said last named scutching wheel and breaker roll rotating at the same speed in opposite directions and performing a combing and scutching operation on the fibers, a condenser for receiving the fibers from the feeding wheel, a series of combing conveyors, the speed of each of the combing conveyors being greater than the speed of delivery of the fibrous material thereto and the speed of each succeeding combing conveyor being greater than the speed of the preceding combing conveyor, means for forcing and retaining the fibrous material in association with the combing conveyors, means for re-forming the fibrous material into sliver form after delivery from the combing conveyors, and means for cutting the fibrous material into lengths upon its emergence from the last named sliver forming device.

16. An apparatus for treating fibrous material comprising in combination, an anvil, a scutching wheel associated therewith, means for feeding fibrous stalk material over the anvil and into association with the scutching wheel to have the scutching operation performed thereon, a breaker roll, a plurality of scutching rollers associated therewith and spaced about the periphery thereof, the scutching rollers cooperating with the breaker roll to form sinuous paths through which the partially scutched fibrous material is led from the associated anvil and scutching roll, said latter named scutching rollers being provided with radially extending arms of a length sufficient to force loops of fibrous material into the interior of the breaker roll, and a breaker bar mounted within the breaker roll and operable to remove the shive material from the fibrous material at the loops formed therein by the scutching wheels.

ANTON F. BURKARDT.